Dec. 9, 1958  R. A. LAUTIER ET AL  2,863,494
SEATS

Filed Feb. 1. 1957  2 Sheets-Sheet 1

INVENTORS
ROGER A. LAUTIER
JAMES F. SPIELMAN
BY
James G. Bethell
ATTORNEY

Dec. 9, 1958  R. A. LAUTIER ET AL  2,863,494
SEATS
Filed Feb. 1, 1957  2 Sheets-Sheet 2
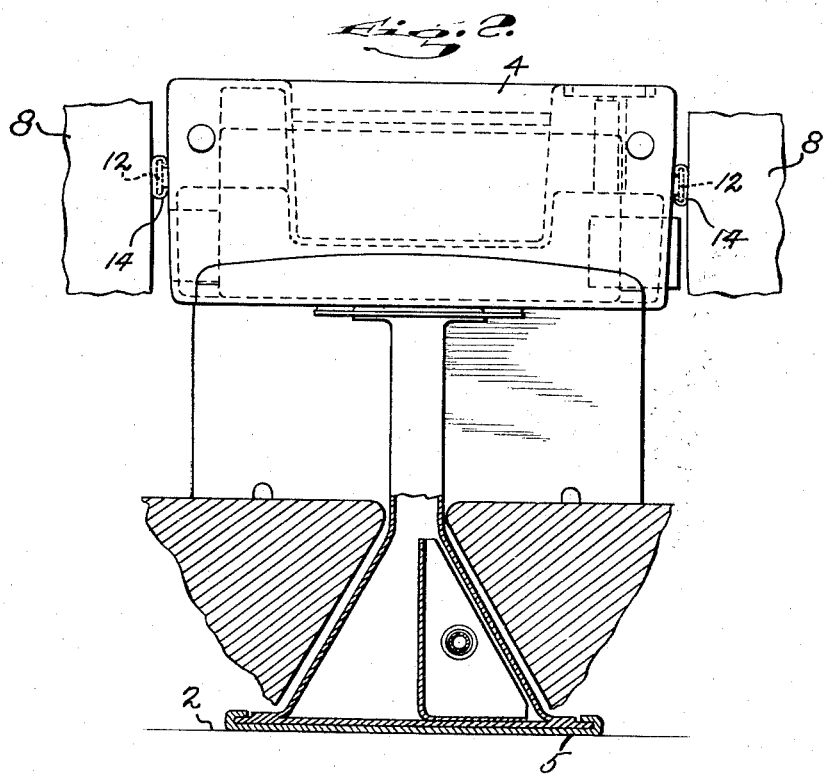
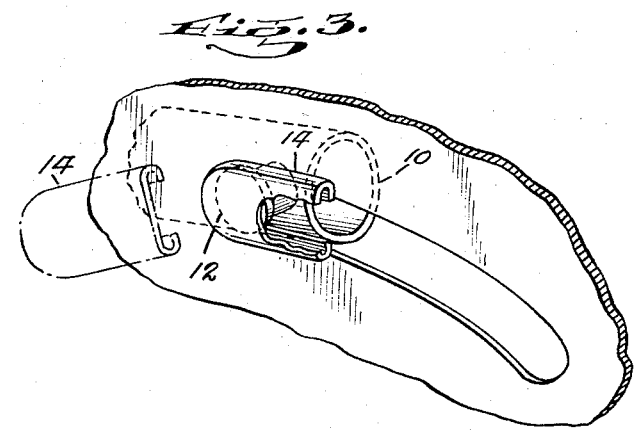
INVENTORS
ROGER A. LAUTIER
JAMES F. SPIELMAN
BY
James G. Bethell
ATTORNEY

2,863,494

SEATS

Roger A. Lautier, Litchfield, and James F. Spielman, Torrington, Conn., assignors to The Aerotherm Corporation, Bantam, Conn., a corporation of Connecticut Application February 1, 1957, Serial No. 637,767

1 Claim. (Cl. 155—112)

Our invention is directed to an improvement in armrests, particularly armrests for aircraft seats, and has for one of its objects to provide an armrest which is installed simply by sliding the same in place on the seat frame from an end of the frame.

Another object of the invention is to provide an armrest which is slidably mounted relatively to the seat frame for installation or removal purposes, the armrest carrying one or more pushbuttons or like device for various services, such as hostess call, radio, etc. The armrest may also be provided with air outlets and suitable valve-operating buttons for controlling the discharge of air as desired by the seat occupant. The armrest is supplied with a flexible utility lead for the various buttons and valves just mentioned, and this lead may extend along the underside of the seat and be detachably connected to suitable outlets in the side of the aircraft, thereby eliminating the necessity for nipple and socket connections on the armrest and seat frame.

The armrest also carries recline locking mechanism and the necessary control buttons therefor for the seat back or backrest, this mechanism being connected to the seat back by a connection which becomes detached by folding the seat back forwardly from erect position, so that the armrest and the various elements or devices carried thereby may be removed as a unit from the seat frame simply by sliding the armrest rearwardly of the frame. It should be noted that the detachable connection between the seat back and the recline locking mechanism is restored simply by sliding the armrest in place on to the seat frame and then raising the seat back to erect position.

In the accompanying drawings:

Fig. 2 is a forward elevational view of our improved armrest; and

Fig. 3 is a fragmentary view of the detachable connection between the seat back and the recline locking mechanism carried in the armrest.

Figure 1:
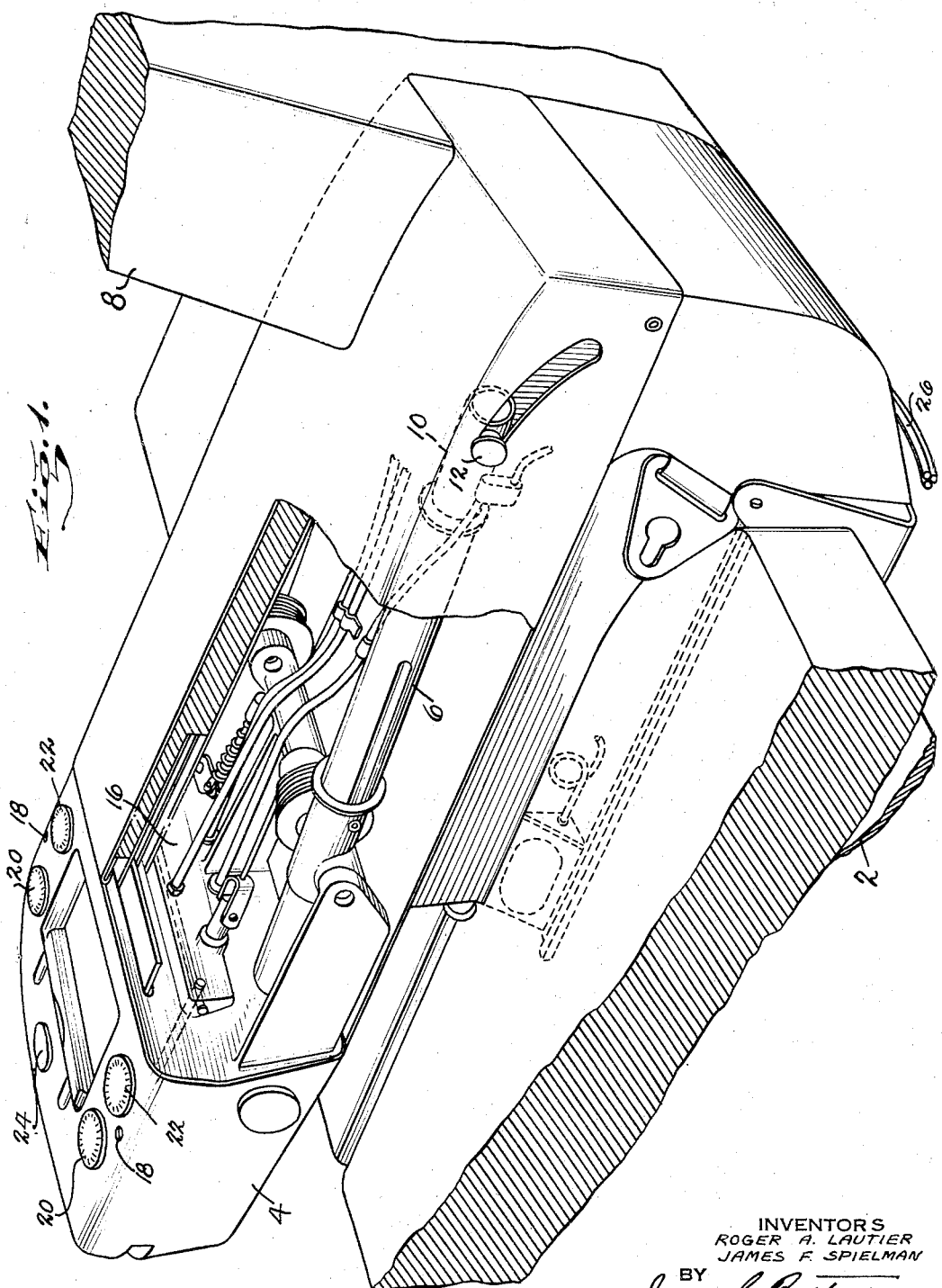
Fig. 1 is a view in perspective of an embodiment of our invention.

Referring to the drawings in detail, 2 designates a seat frame and 4 our improved armrest. As will be seen from Fig. 2, the seat frame is provided with a track 5. This track extends fore and aft of the seat. The armrest is slidably interlocked with this track, as plainly shown in Fig. 2, so as to provide for sliding of the armrest, on to the seat frame from the frame end, thereby facilitating installation of the armrest as well as its ready removal from the seat frame.

Mounted within and fixed to the armrest is recline locking mechanism 6. This mechanism, which permits the seat back or backrest 8 to be moved to various angles of recline and then locks the back in adjusted position, may take any one of several forms commercially available but essentially embodies member 10 axially movable lengthwise of the armrest. This member carries a knob 12, which projects to the exterior of the armrest. This knob is detachably attached to the seat back 8. This detachable connection between the knob and seat back comprises a U-shaped catch or clip 14, fixed to the seat back and normally engaged with the knob 12. When the seat back 8 is tilted rearwardly to various angles of recline, the connection between the seat back and the recline locking mechanism remains intact, and the member 10 of the locking mechanism is moved axially by the seat back.

It will be appreciated that, when it is desired to slide the armrest rearwardly off the seat frame, it is necessary to disconnect the locking mechanism 6 from the seat back, in other words, to disconnect the clip 14 carried by the seat back from the knob 12 of the locking mechanism, which is carried by the armrest. To effect this disconnection, it is merely necessary to tilt the back of the seat forward from erect position until the clip 14 has cleared the knob 12 at the open end of the clip.

16 designates an air manifold within and fixed to the armrest. Air discharges from the manifold 16 through one or more air outlets 18, with which the armrest is provided, upon manipulation of valve-operating button or buttons 20, fixed to the armrest. Fixed to the armrest are one or more service pushbutton switches 22 for headrest music or a radio, and a hostess call pushbutton switch 24. The utility lead for the air manifold and for the buttons 22 and 24 has been designated 26, and it is simply brought out through the armrest and then plugged into or otherwise connected to the proper outlets provided for the purpose in the side of the conveyance in which the seat is located.

It will be apparent that, when removing the armrest from the seat frame, it is merely necessary to tilt the backrest or seat back 8 forward from erect position over the seat bottom, thereby to disconnect the seat back from the recline locking mechanism. The armrest, together with the elements fixed thereto and above described, can then be slid rearwardly of the seat to remove the armrest and contained elements as a unit from the seat frame.

It will be seen from all of the foregoing that our invention provides a seat in which the armrest is slidably mounted on the seat frame so that it may be installed or removed by sliding the armrest fore and aft relatively to the seat frame.

It will be seen furthermore that one or more elements, such as a call button, air valve button, etc., may be carried by the armrest in such fashion as to be removable as a unit with the armrest or installed as a unit therewith.

It is to be understood that changes may be made in the details of construction and arrangement of parts hereinabove described within the purview of our invention.

What we claim is:

A seat comprising, in combination, a seat frame; an armrest for the seat mounted on and slidably interlocked with said frame; a seat back or backrest carried by the seat frame and tiltable relatively thereto to various angles; locking mechanism mounted on and secured to said armrest for locking the seat back at various tilted positions rearwardly of erect position, said locking mechanism comprising an axially movable tube provided with a lateral projection or knob; and a clip secured to and moving with the seat back as the latter is tilted, said clip being closed at one end and open at the other and said knob normally lying within the clip so that its closed end will engage said knob to move the said axially movable tube rearwardly of the seat frame as the seat back is tilted rearwardly from erect position to accommodate the locking mechanism to the various angles of recline of the seat back, movement of the seat back forward from erect position carrying the clip in the same direction until the said knob is outside the clip and the armrest and locking mechanism may be slid as a unit from or on to the said frame.

References Cited in the file of this patent

UNITED STATES PATENTS

| | | |
|---|---|---|
| 1,105,822 | Murphy | Aug. 4, 1914 |
| 2,145,669 | Thompson | Jan. 31, 1939 |
| 2,200,647 | Vanderploeg | May 14, 1940 |
| 2,581,197 | McFadden | Jan. 1, 1952 |
| 2,668,581 | Luketa | Feb. 9, 1954 |